(12) United States Patent
Shimada

(10) Patent No.: US 8,576,680 B2
(45) Date of Patent: Nov. 5, 2013

(54) CIRCUIT FOR GENERATING A SIGNAL FOR CONTROLLING REPRODUCTION OF DATA RECORDED ON AN OPTICAL DISC

(75) Inventor: Hiroshi Shimada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 139 days.

(21) Appl. No.: 13/182,543

(22) Filed: Jul. 14, 2011

(65) Prior Publication Data

US 2012/0147720 A1 Jun. 14, 2012

(30) Foreign Application Priority Data

Dec. 8, 2010 (JP) ................. 2010-273536

(51) Int. Cl.
*G11B 15/52* (2006.01)

(52) U.S. Cl.
USPC ..................... 369/47.35; 369/47.36

(58) Field of Classification Search
None
See application file for complete search history.

(56) References Cited

U.S. PATENT DOCUMENTS

| | | | | |
|---|---|---|---|---|
| 5,854,781 A | * | 12/1998 | Kurihara | ........... 369/53.29 |
| 7,154,830 B2 | | 12/2006 | Huang | |
| 2003/0117912 A1 | * | 6/2003 | Yoshimi et al. | ........... 369/44.28 |
| 2003/0174601 A1 | * | 9/2003 | Tsai et al. | ........... 369/44.36 |
| 2006/0215515 A1 | * | 9/2006 | Toda et al. | ........... 369/47.53 |
| 2007/0014216 A1 | * | 1/2007 | Shimakawa | ........... 369/47.5 |
| 2007/0280059 A1 | * | 12/2007 | Cheng et al. | ........... 369/44.25 |

FOREIGN PATENT DOCUMENTS

| | | |
|---|---|---|
| JP | 10-134369 | 5/1998 |
| JP | 2005-011483 | 1/2005 |

\* cited by examiner

*Primary Examiner* — Paul Huber
(74) *Attorney, Agent, or Firm* — White & Case LLP

(57) ABSTRACT

According to one embodiment, a circuit for generating a signal has an amplifier, first and second detection circuits, first and second A/D converters, and a digital signal processing circuit. The amplifier amplifies an electric signal corresponding to an intensity of a reflected light from an optical disc. The first detection circuit detects an upper envelope of an output signal from the amplifier, and outputs an upper envelope signal. The second detection circuit detects a lower envelope of an output signal from the amplifier, and outputs a lower envelope signal. The first A/D converter converts the upper envelope signal into a first digital signal. The second A/D converter converts the lower envelope signal into a first digital signal. The digital signal processing circuit performs calculation processing of the first and the second digital signals, and outputs a signal for controlling reproduction of data recorded on the optical disc.

11 Claims, 11 Drawing Sheets

CIRCUIT FOR GENERATING A SIGNAL FOR CONTROLLING REPRODUCTION OF DATA RECORDED ON AN OPTICAL DISC

CROSS-REFERENCE TO RELATED APPLICATION(S)

This application is based upon and claims the benefit of priority from the prior Japanese Patent Application No. 2010-273536, filed on Dec. 8, 2010, the entire contents of which are incorporated herein by reference.

FIELD

1. Technical Field

Embodiments described herein relate generally to a circuit which generates a signal for controlling reproduction of data recorded on recorded on an optical disc.

2. Background

Optical disc playback equipment is widely used. The optical disc playback equipment reproduces data recorded on an optical disc such as CD or DVD. In the optical disc playback equipment, a laser beam is radiated onto a recorded surface of a disc. Further, in the equipment, a reflected light from the recorded surface is received by a light receiving element such as a photodetector via an optical system so that the intensity of the reflected light is converted into an electric signal.

When a position of the optical system is changed to point a new track position to be accessed during playback, a microcomputer provided inside the optical disc playback equipment calculates the number of tracks located between the new track position to be accessed and a current track position, and moves the optical system to the new track position to be accessed according to the calculated number of tracks.

At that time, whether the optical system moves correctly is necessary to be observed, and observation results needs to be transmitted to the microcomputer. For this purpose, conventionally, track crossing of the optical system is detected based on change of an output level of the light receiving element when the optical system moves so that a track crossing detection signal is obtained.

In a case that a defect such as a crack or dirt exists on a recorded surface of an optical disc, the output level of the light receiving element is affected so that the track crossing can not be detected correctly.

Further, such a defect influences reproduction of data read from an optical disc. Accordingly, detection of a defect existing on a recorded surface of an optical disc is also required.

As described above, in reproducing data recorded in an optical disc, detection of state of a surface of the optical disc and generation of a signal for controlling data reproduction from the optical disc are necessary based on an electric signal outputted from a light receiving element. When a defect exists on a recorded surface of an optical disc, the signal for controlling data reproduction is difficult to be generated correctly.

DETAILED DESCRIPTION

Figure 1:
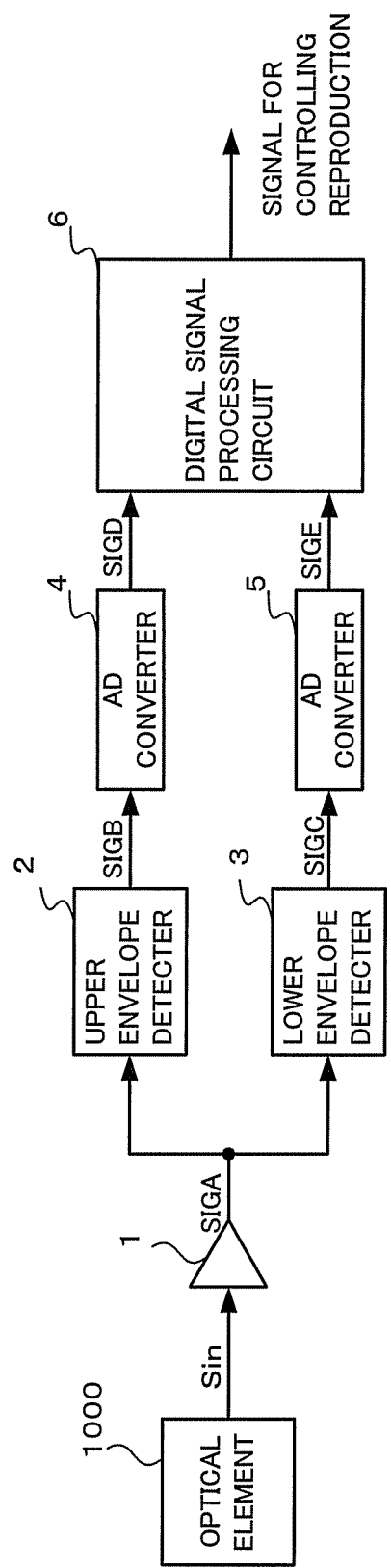
FIG. 1 is a block diagram showing a circuit for generating a signal according to a first embodiment.

According to one embodiment, a circuit for generating a signal for controlling reproduction of data recorded on an optical disc is provided. The circuit has an amplifier, first and second detection circuits, first and second A/D converters, and a digital signal processing circuit.

The amplifier amplifies an electric signal corresponding to an intensity of an reflected light from an optical disc. The first detection circuit detects an upper envelope of an output signal from the amplifier, and outputs an upper envelope signal. The second detection circuit detects a lower envelope of an output signal from the amplifier, and outputs a lower envelope signal. The first A/D converter converts the upper envelope signal into a first digital signal. The second A/D converter converts the lower envelope signal into a first digital signal. The digital signal processing circuit performs calculation processing of the first and the second digital signals, and outputs a signal for controlling reproduction of data recorded on the optical disc.

Hereinafter, further embodiments will be described with reference to the drawings. In the drawings, the same reference numerals denote the same or similar portions respectively.

A first embodiment will be described with reference to FIG. 1. FIG. 1 is a block diagram showing a circuit for generating a signal according to a first embodiment.

In optical disc playback equipment, a recorded surface of a optical disc is irradiated with a laser beam, and a reflected light from the recorded surface is received by a light receiving element. Further, in the light receiving element, the intensity of the reflected light is converted into an electric signal so that data recorded on the optical disc is reproduced. For example, when the track position to be accessed is changed during playback, an optical system for receiving reflected light is moved.

The circuit of the first embodiment is provided with an amplifier 1, detection circuits 2 and 3, A/D converters 4 and 5, and a digital signal processing circuit 6. optical generates a signal for controlling data reproduction.

The amplifier 1 amplifies an electric signal inputted from a light receiving element 1000 which performs photoelectric conversion of an intensity of a reflected light from an optical disc. The detection circuit 2 detects an upper envelope of an output signal SIGA from the amplifier 1, and outputs an upper envelope signal SIGB. The detection circuit 3 detects a lower envelope of the output signal SIGA from the amplifier 1, and outputs a lower envelope signal SIGC.

The A/D converter 4 changes the upper envelope signal SIGB into digital data, and outputs a digital signal SIGD of the upper envelope. The A/D converter 5 changes the lower envelope signal SIGC into digital data, and outputs a digital signal SIGE of the lower envelope. The digital signal processing circuit 6 performs calculation processing described below using the digital signals SIGD, SIGE of the upper and lower envelopes, and outputs a signal for controlling production of data recorded on the optical disc.

Figure 2:
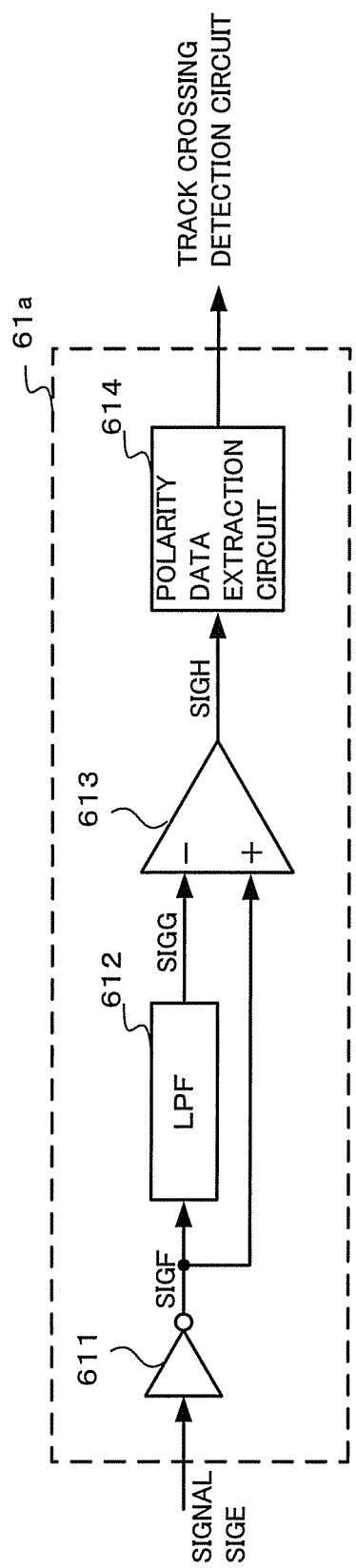
FIG. 2 is a block diagram showing an example of a processing block contained in a digital signal processing circuit constituting the circuit shown in FIG. 1.

In the digital signal processing circuit 6, various calculation processing blocks may be contained. According to the embodiment, a processing block 61*a* shown in FIG. 2 is contained. The processing block 61*a* detects track crossing of an optical system which moves above the optical disc.

FIG. 2 shows an example of the processing block 61*a* which detects track crossing.

The processing block 61*a* is provided with an inverter 611, a low pass filter (LPF) 612, a subtracter 613, and a polarity data extraction circuit 614.

The inverter 611 reverses the polarity of the digital signal SIGE of the lower envelope and outputs a reversed digital signal SIGF of the lower envelope. The low pass filter 612 extracts a low-frequency component of the reversed digital signal SIGF of the lower envelope. The subtracter 613 subtracts the output data SIGG of the low pass filter 612 from the digital signal SIGF of the lower envelope. The polarity data extraction circuit 614 extracts polarity data from an output data SIGH of the subtracter 613 as a track crossing detection signal.

Operation of the circuit of the embodiment will be explained with reference to FIGS. 3-6.

Figure 3:
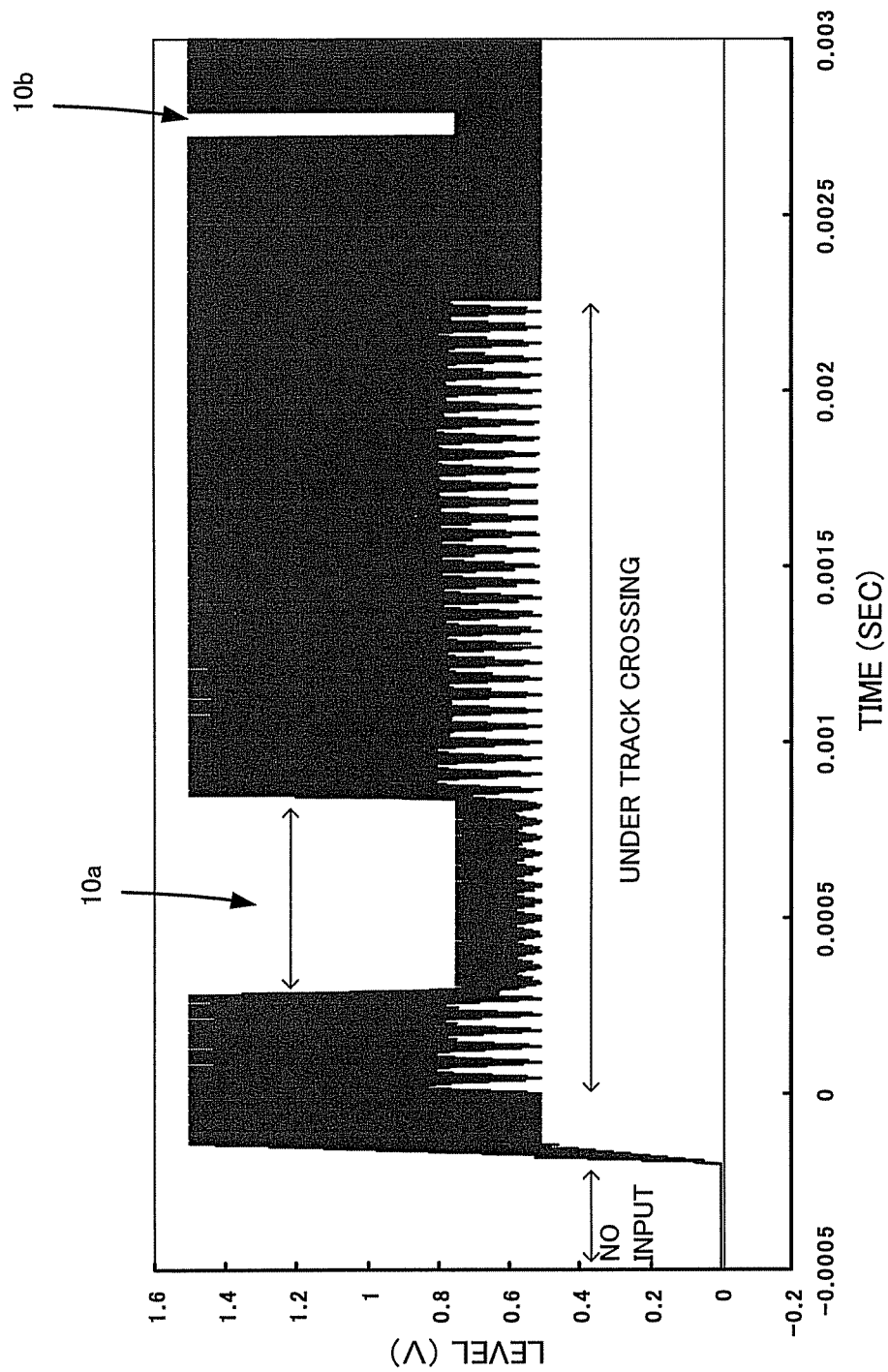
FIG. 3 shows an example of an output waveform of an amplifier constituting the circuit shown in FIG. 1.

FIG. 3 shows an example of a wave form of the output signal SIGA from the amplifier 1 of FIG. 1. The amplifier 1 amplifies the electric signal inputted from the light receiving element 1000, and changes the electric signal to a signal level which is difficult to be influenced by noises from outside. A direct current component is contained in the output signal SIGA of the amplifier 1. Accordingly, the signal level of the output signal SIGA, which is obtained when the electric signal is inputted to the amplifier 1, is certainly deviated in a direction i.e. in the direction of plus (+) as shown in FIG. 3 from an output level obtained in a case that electric signal is not inputted into the amplifier 1.

The output signal SIGA of the amplifier 1A contains a high frequency component since modulated digital information exists in the output signal SIGA deviated in the direction of plus (+). In FIG. 3, the portion which looks like a black painted-out portion shows that the output signal SIGA of the amplifier contains the high frequency component.

When the optical system passes above a field 10*a* with crack and a crack 10*b* which exist on the optical disc surface during track crossing or tracking, the amplitude of the output signal SIGA of the amplifier 1 becomes quite small, as shown in FIG. 3.

The output signal SIGA of the amplifier 1 is inputted into the detection circuits 2, 3. The upper and lower envelopes are detected in the detection circuits 2, 3 respectively so that the upper and lower envelope signals SIGB, SIGC are obtained as shown in FIG. 4.

Figure 4:
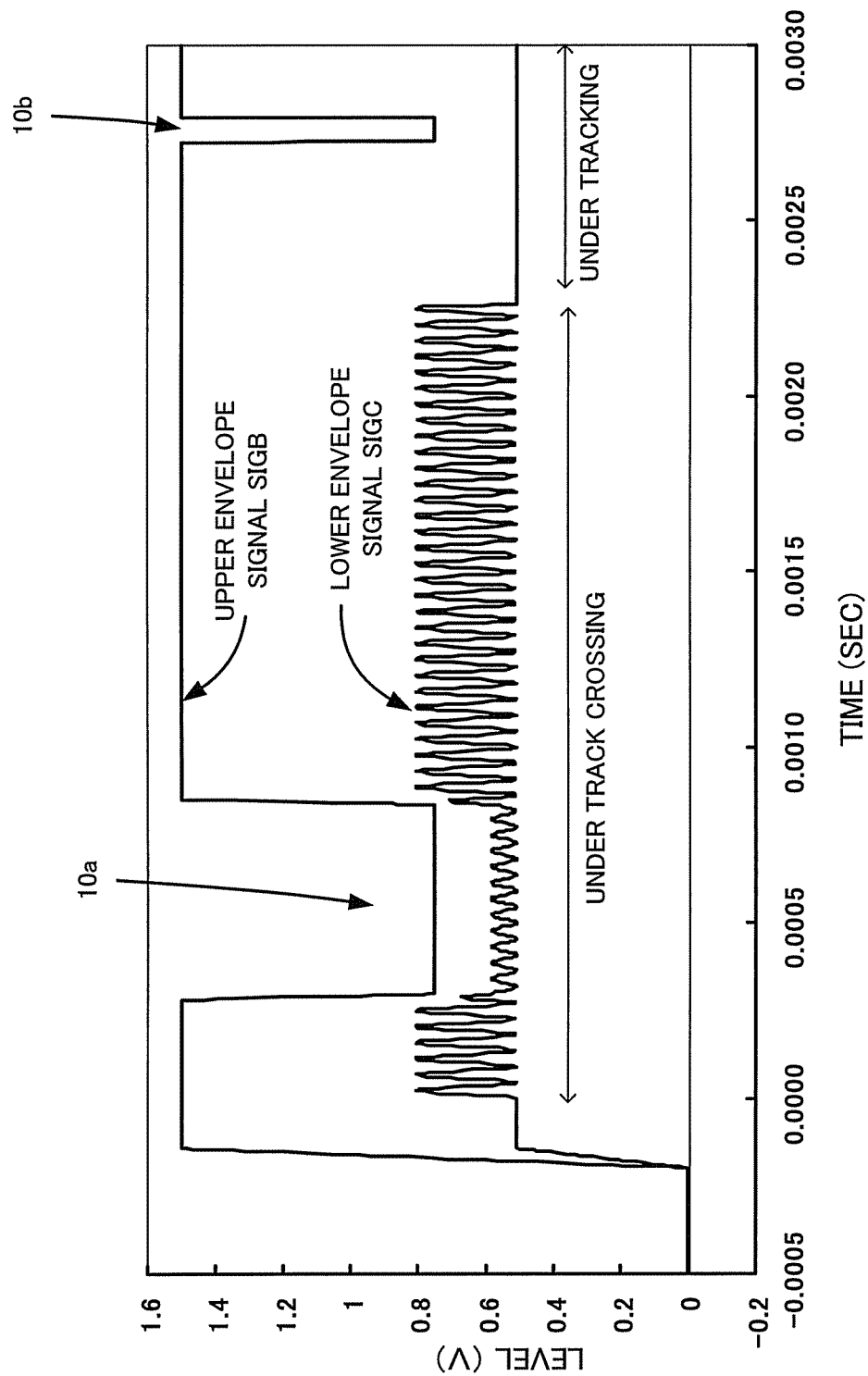
FIG. 4 shows examples of output waveforms of upper and lower envelope detection circuits constituting the circuit shown in FIG. 1.

The situation of change of the signal level of the upper envelope signal SIGB is seen in FIG. 4. The signal level of the upper envelope signal. SIGB is found to be remarkably low for the field 10*a* with crack and the crack 10*b* which exist on the optical disc surface, during track crossing and tracking. On the other hand, the situation of change of the signal level of the lower envelope signal SIGC is seen. During track crossing, the amplitude of the lower envelope signal SIGC becomes small for the field 10*a*, but the signal level of the lower envelope signal SIGC is found to change periodically. Further, the signal level of the lower envelope signal SIGC is found not to change during tracking, even if the crack 10*b* exists on the optical disc surface.

According to the embodiment, the processing block 61*a* of FIG. 2 detects track crossing using the digital signal SIGE of the lower envelope which is obtained through digital conversion of the lower envelope signal SIGC.

Figure 5:
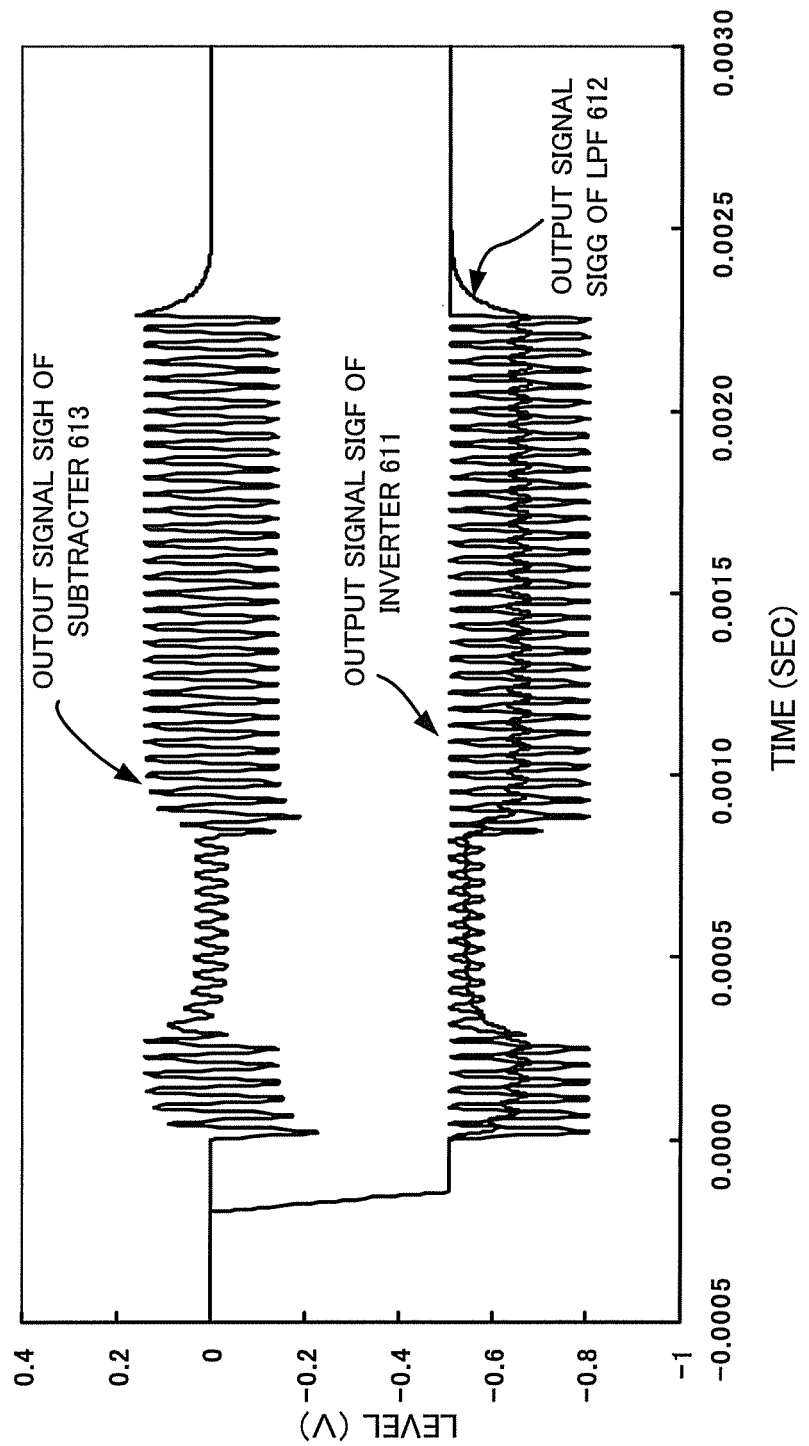
FIG. 5 shows examples of operation waveforms which arise inside the processing block shown in FIG. 2.

FIG. 5 shows waveform images which indicate results of digital signal processing with the inverter 611, the low pass filter 612 and the subtracter 613 respectively contained in the processing block 61*a*, so that the results may be easily understood visually.

The output signal SIGF of the inverter 611 is a digital signal indicating a reversed lower envelope obtained by reversion of the polarity of the digital signal SIGE of the lower envelope, and the output signal SIGG of the low pass filter 612 is low-frequency component data extracted from the digital signal SIGF indicating the reversed lower envelope.

The output signal SIGH of the subtracter 613 is subtraction data as a result of subtracting the low-frequency component data SIGG from the digital signal SIGF indicating the reversed lower envelope. As shown in FIG. 5, the subtraction data SIGH outputted from the subtracter 613 has a waveform showing a vibration with a signal level of zero (0) set as a center. Accordingly, when the subtraction data SIGH is expressed by numeric representations with polarity symbols, the polarity symbols are expressed as repeating '0' and '1' alternately, for example. The change between '0' and '1' appears whenever a track crossing is performed.

The polarity data extraction circuit 614 extracts polarity data from the subtraction data SIGH as the output of the subtracter 613, and outputs the extraction result as a track crossing detection signal.

Figure 6:
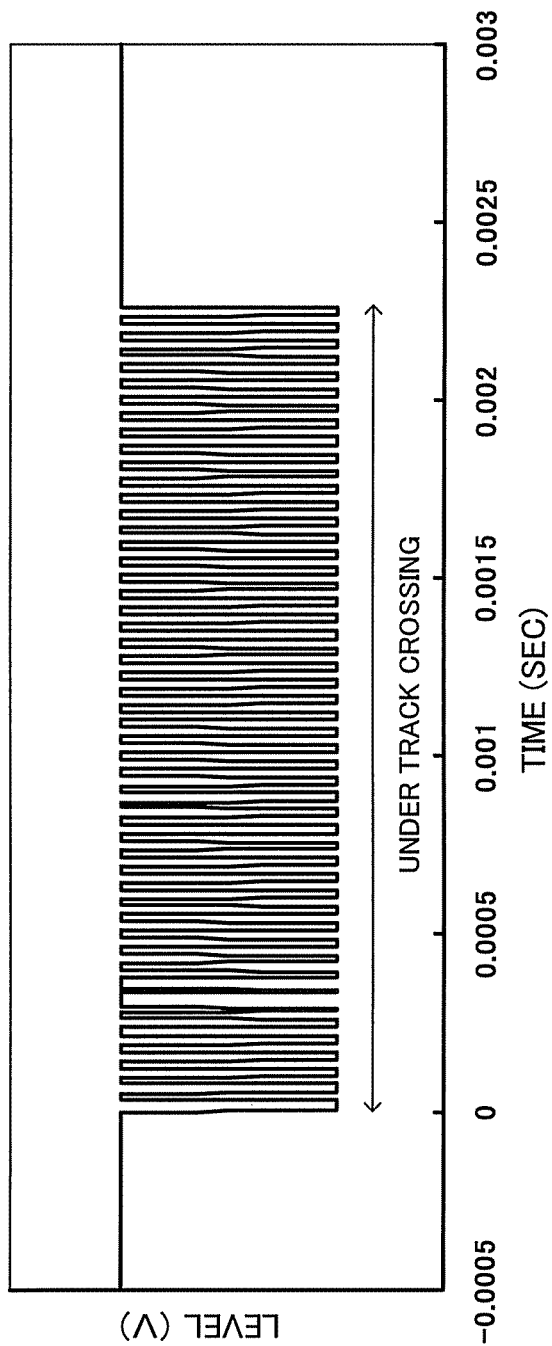
FIG. 6 shows an example of an output waveform of the processing block shown in FIG. 2.

FIG. 6 shows an example of the track crossing detection signal outputted from the polarity data extraction circuit 614. As shown in FIG. 6, repetition of '0' and '1' appear without missing, even when the optical system moves above the field 1*a* with crack existing on the optical disc surface, during track crossing.

On the other hand, when the optical system moves above the field with the crack 1*b* existing on the optical disc surface, during tracking, the signal level of the track crossing detection signal does not change due to existence of the crack 1*b*.

Accordingly, so far as repetition of '0' and '1' appear in the track crossing detection signal, the movement of the optical system can be judged as "crossing track." The digital signal processing circuit 6 of FIG. 1 outputs the track crossing detection signal as a signal for controlling data reproduction.

Figure 7:
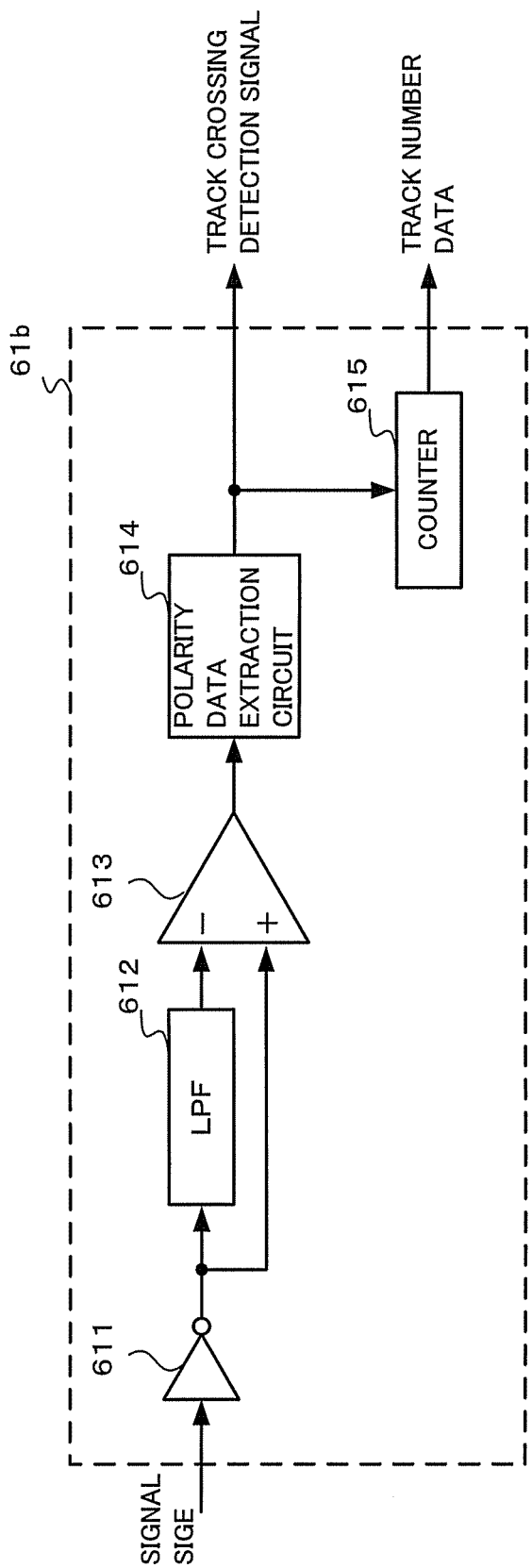
FIG. 7 is a block diagram showing another example of the processing block contained in the digital signal processing circuit.

Instead of the processing block 61*a* used in the above embodiment, a processing block 61*b* shown in FIG. 7 may be used.

The processing block 61*b* shown in FIG. 7 is provided with a circuit same as the processing block 61*a* of FIG. 2 and a counter 615.

The counter 615 counts polarity changes of the polarity data contained in the track crossing detection signal outputted from the polarity data extraction circuit 614. The counted value increases every time the optical system crosses a track. The counter 615 counts the number of tracks above which the optical system passes during track crossing, and outputs the count result as a track number data.

In a case that the digital signal processing circuit 6 of FIG. 1 contains the processing block 61*b*, the digital signal processing circuit 6 outputs the track crossing detection signal and the track number data as signals for controlling reproduction According to the embodiment, the digital signal processing circuit 6 performs calculation processing for the digital signal SIGE of the lower envelope. By this calculation processing, even if a crack exists on the optical disc surface, the signal indicating movement of the optical system crossing a track can be outputted correctly. Similarly, the data indicating the number of tracks above which the optical system passes during track crossing can also be outputted correctly.

As shown in FIG. 4, the signal level of the upper envelope signal SIGB falls greatly when the optical system moves above the fields with crack existing on the optical disc surface, during track crossing and tracking.

A second embodiment will be described below. The second embodiment uses the falls of the signal level of the upper envelope signal SIGB. The second embodiment is same as the circuit shown in FIG. 1 except for a processing block which is contained in the digital signal processing circuit 6. In this case, the digital signal processing circuit 6 converts the upper envelope signal SIGB into digital data, and performs calculation processing using the obtained digital data of the upper envelope. The digital signal processing circuit 6 further outputs a defect detection signal which indicates that a defect such as a crack is detected, as a signal for controlling data reproduction.

Figure 8:
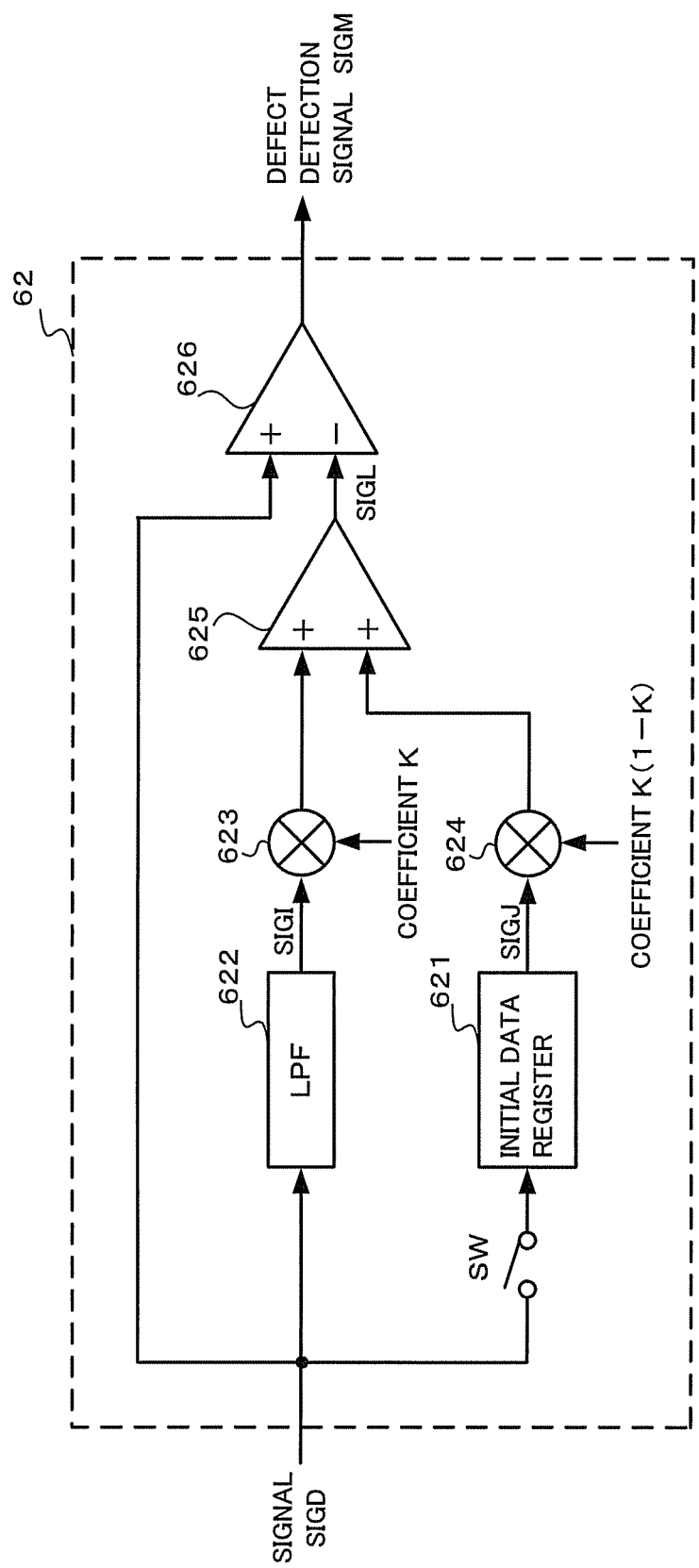
FIG. 8 is a block diagram showing an example of a processing block contained in a digital signal processing circuit constituting a circuit for generating a signal according to a second embodiment.

FIG. 8 is a block diagram showing ane example of a processing block 62 contained in the digital signal processing circuit 6 of a second embodiment.

The processing block 62 is provided with a register 621, a low pass filter 622, multipliers 623,624, an adder 625 and a subtracter 626. The register 62 stores an output of the A/D converter 4 as initial data of the upper envelope by closing a switch SW, in advance before a reflected light is inputted into the optical element 1000 of FIG. 1. The initial data of the upper envelope is obtained from the A/D converter 4 in a state where any reflected light is not inputted from an optical disc. The low pass filter 622 removes a high-frequency component of the digital signal SIGD of the upper envelope outputted from the A/D converter 4 when a reflected light is inputted into the optical element 1000. The low pass filter 622 outputs low-frequency data of the upper envelope.

The multiplier 623 performs multiplication of the low-frequency data of the upper envelope from the low pass filter 622 by a predetermined coefficient K. The multiplier 624 performs multiplication of the initial data of the upper envelope from the register 621 by a coefficient (1−K). The adder 625 adds an output of the multiplier 623 and an output of the multiplier 624. The subtracter 626 subtracts the output value of the adder 625 from the value of the digital signal of the upper envelope, and outputs the subtraction result i.e. polarity data as a defect detection signal SIGM.

The coefficient K is a value set according to the allowable value of the depth of a crack which is changed depending on discs. The coefficient K defines a threshold value to be used as a reference for defect detection.

A calculation processing of the processing block 62 will be described below.

The following value DATA1 is information to be used for defect detection. The initial data SIGJ of the upper envelope from the register 621 is subtracted from the digital signal SIGD of the upper envelope outputted from the A/D converter 4 of FIG. 1 so that the value DATA1 is obtained.

$$DATA1 = SIGD - SIGJ \quad (1)$$

The time constant of the low pass filter 622 is set at a large value to such an extent that the low pass filter 622 is not influenced by a defect. As a result, the output SIGI of the low pass filter 622 holds the level of a portion of the digital signal SIGD of the upper envelope where any defect does not exist. The initial data SIGJ of the upper envelope is subtracted from the output SIGI of the low pass filter 622 so that the following value DATA2 is obtained. The value DATA2 is multiplied by the coefficient K (0<K<1) so that the following value DATA3 is obtained as a reference level for defecting a detection.

$$DATA2 = SIGI - SIGJ \quad (2)$$

$$DATA3 = K \times (SIGI - SIGJ) \quad (3)$$

The value DATA1 and the value DATA3 are compared, and the period when the value DATA3 becomes larger than the value DATA1 can be detected as "a period of defect." In this case, the value of detection level indicating a desired ratio to the original digital signal SIGD can be determined by setup of coefficient K easily. For example, the coefficient K is set as "K=0.5" in order that the value of the detection level may be 50% of the level of the digital signal of the upper envelope.

In order to compare the value DATA1 and the value DATA3, the difference of the value DATA1 and value DATA3 is calculated according to the following formula, and the polarity of the difference is used as a defect detection result. This calculation is performed in the processing block 62.

$$DATA4 = DATA1 - DATA3 \quad (4)$$
$$= (SIGD - SIGJ) - K \times (SIGI - SIGJ)$$
$$= SIGD - [(1 - K) \times SIGJ + K \times SIGI]$$

Figure 9A:
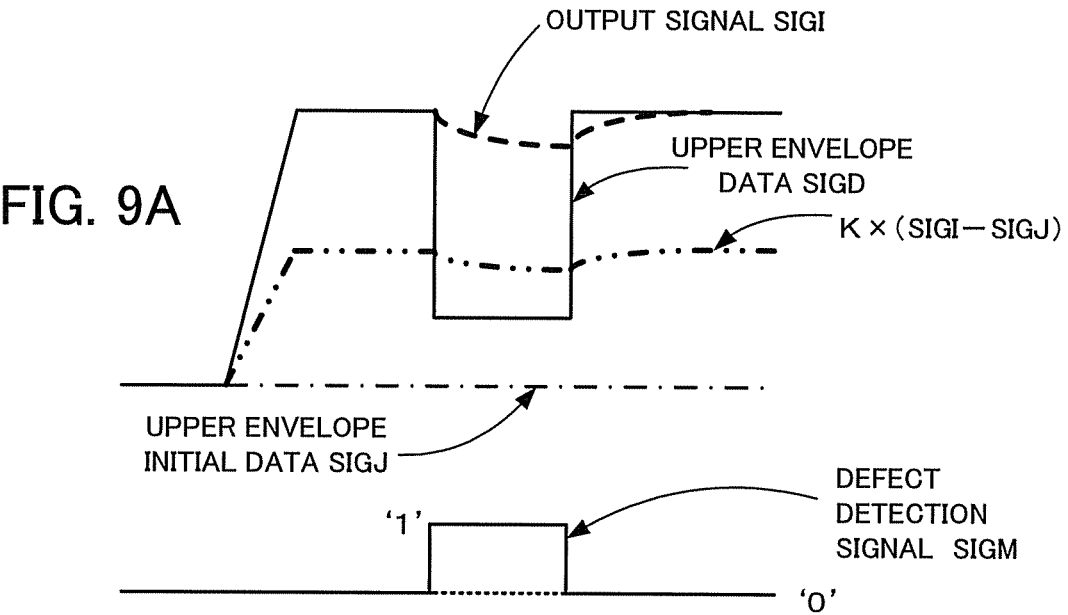
FIGS. 9A and 9B are views to explain operation of the processing block shown in FIG. 8, respectively.
Figure 9B:
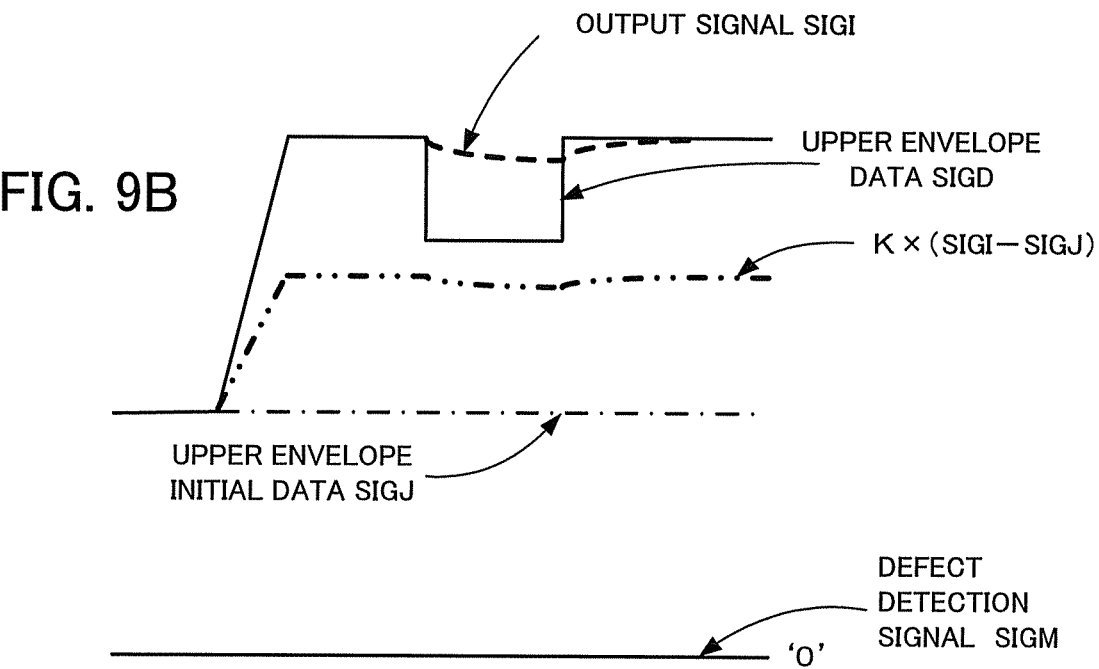

FIGS. 9A and 9B show a relationship between the values DATA1, DATA3 and the depth of a crack. FIG. 9A indicates the situation of change of the digital signal SIGD and the output SIGI of the low pass filter 622 in a case that the crack is deep. FIG. 9B indicates the situation of change of the digital signal SIGD and the output SIGI of the low pass filter 622 in a case that the crack is shallow.

The change of the level of the digital signal SIGD of the upper envelope becomes large as the crack is deep. Accordingly, in FIG. 9A, the portion of the digital signal SIGD corresponding to the crack is less than the value K×(SIGI−SIGJ) as the reference level of the defect detection. As a result, during the period when the level of the digital signal SIGD falls, the defect detection signal SIGM has a negative polarity (the polarity symbol='1').

On the other hand, in FIG. 9B, since the crack is shallow, the digital signal SIGD is not less than the value K×(SIGI−SIGJ) as the reference level of the defect detection. Accordingly, the defective detection signal SIGM has a positive polarity (the polarity symbol='0') during the period when the level of the digital signal SIGD falls.

As described above, the defective detection signal SIGM from the subtracter 626 has a positive value when the depth of a crack is within an allowable level, and has a negative value when the depth of a crack exceeds the allowable level. The processing block 62 transmits the output of the subtracter 626 as a defect detection signal to determine whether any crack of the depth is equal to or beyond the allowable value based on the polarity of the output.

According to the embodiment, the processing block 62 performs calculation processing for the digital signal SIGD of the upper envelope so that the defective detection signal can be outputted as a signal for controlling reproduction.

The processing circuit 6 may contain the processing block 61a or processing block 61b shown in the first embodiment.

In some cases, the amplitude of an output signal from an optical element which receives a reflected light from an optical disc may change with a physical difference of an optical disc or a surface state of the optical disc.

A circuit for generating a signal according to a third embodiment described below provides a stable amplification output even when the amplitude of the signal from the optical element is not constant.

Figure 10:
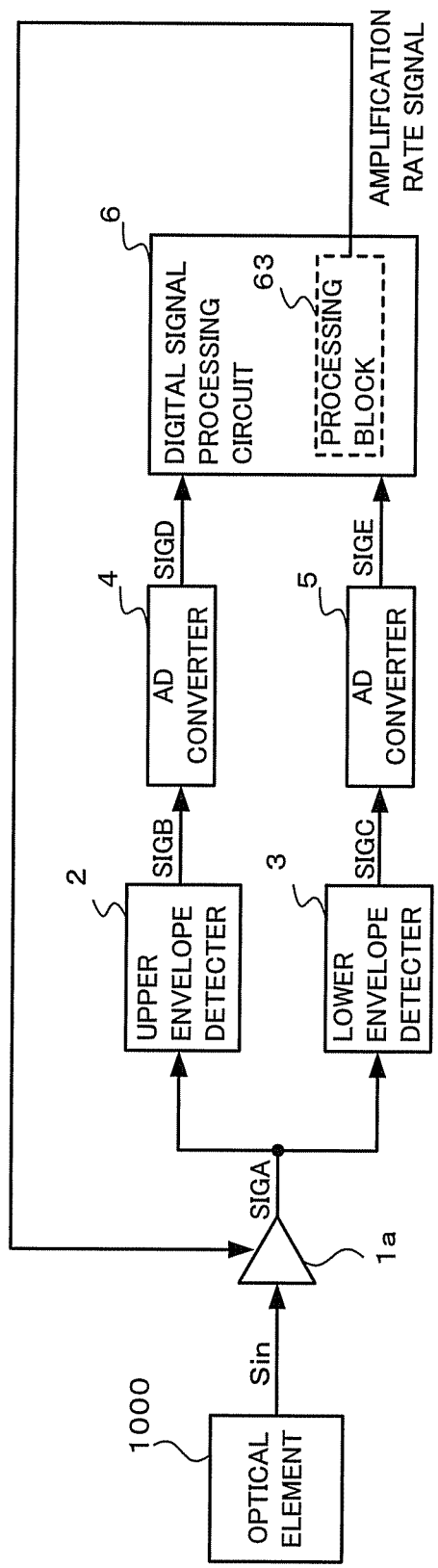
FIG. 10 is a block diagram showing a circuit for generating a signal according to a third embodiment.

FIG. 10 is a block diagram showing the circuit according to the third embodiment.

The circuit of the third embodiment uses an amplification rate variable amplifier 1a instead of the amplifier 1 of FIG. 1. The amplification rate variable amplifier 1a can change the amplification rate. The amplification rate of the amplification rate variable amplifier 1a is controlled by an amplification rate signal which is outputted from a processing block 63 described below which is contained in the digital signal processing circuit 6. Other portions of the circuit of the third embodiment are same as those of the circuit of the first embodiment.

Figure 11:
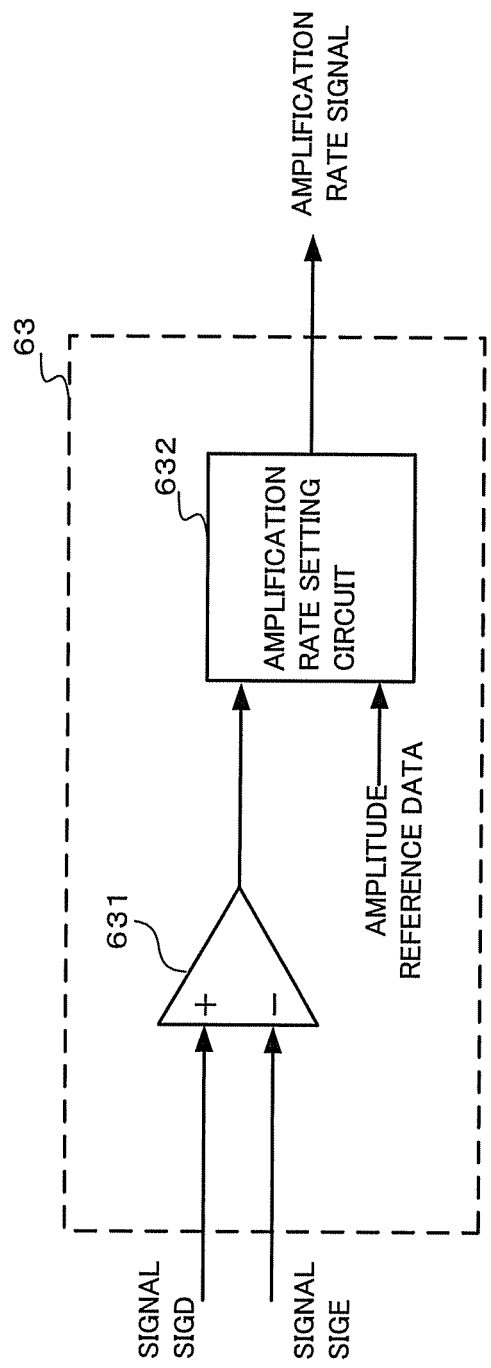
FIG. 11 is a block diagram showing an example of a processing block contained in a digital signal processing circuit constituting the circuit shown in FIG. 10.

The configuration of the processing block 63 is shown in FIG. 11.

The processing block 63 is provided with a subtracter 631 and an amplification rate setting circuit 632. The subtracter 631 subtracts the digital signal. SIGE of the A/D converter 5 from the digital signal SIGD of the A/D converter 4. The amplification rate setting circuit 632 sets the amplification rate of the amplification rate variable amplifier 1a of FIG. 10, and outputs the amplification rate as an amplification rate signal so that the output of subtracter 631 may coincide with predetermined amplitude reference data.

The difference of the digital signals SIGD, SIGE obtained from subtracter 631 becomes amplitude information of the output signal SIGA of the amplification rate variable amplifier 1a shown in FIG. 10.

In the amplification rate setting circuit 632, comparison of the output of subtracter 631 and amplitude reference data is performed. As a result of the comparison, the amplification rate of the amplification rate variable amplifier 1a is raised when the output of subtracter 631 is smaller than the amplitude reference data, and the amplification rate of amplification rate variable amplifier 1a is lowered when the output of subtracter 631 is larger than the amplitude reference data. When the output of subtracter 631 is equal to the amplitude reference data, the amplification rate at that time is maintained. The amplification rate is controlled by the amplification rate setting circuit 632 such that the amplitude of the output signal SIGA of the amplification rate variable amplifier 1a can be maintained at a constant value.

According to such an embodiment, the processing block 63 performs calculation processing for the digital signals SIGD, SIGE, and outputs the amplification rate signal to set up the amplification rate of the amplification rate variable amplifier 1a. As a result, even when the amplitude of the signal from the optical element 1000 is not constant, a stable amplification can be outputted from the amplification rate variable amplifier 1a.

The digital signal processing circuit 6 of the embodiment shown in FIG. 10 may contain the processing block 61a or the processing block 61b which is used in the first embodiment, and also may contain the processing block 62 used in the second embodiment.

According to the embodiments described above, even when a defect exists on a recorded surface of an optical disc, a signal for controlling data reproduction is correctly generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A circuit for generating a signal for controlling reproduction of data recorded on an optical disc, comprising:
    an amplifier to amplify an electric signal corresponding to an intensity of a reflected light from an optical disc;
    a first detection circuit to detect an upper envelope of an output signal from the amplifier, and to output an upper envelope signal;
    a second detection circuit to detect a lower envelope of an output signal from the amplifier, and to output a lower envelope signal;
    a first A/D converter to convert the upper envelope signal into a first digital signal;
    a second A/D converter to convert the lower envelope signal into a second digital signal; and
    a digital signal processing circuit to perform calculation processing of the first and the second digital signals, and to output a signal for controlling reproduction of data recorded on the optical disc, wherein the digital signal processing circuit is provided with:
        an inverter to reverse the polarity of the second digital signal, and to output a third digital signal;
        a first low pass filter to transmit a low-frequency component of the third digital signal;
        a first subtracter to subtract the output signal of the low pass filter from the third digital signal; and
        a polarity data extraction circuit to extract polarity data from the output signal of the first subtracter, and to output a track crossing detection signal as the signal for controlling reproduction.

2. A circuit according to claim 1, wherein the digital signal processing circuit is further provided with a counter to count polarity changes of the polarity data, and to output data indicating the number of crossed tracks as the signal for controlling reproduction.

3. A circuit for generating a signal for controlling reproduction of data recorded on an optical disc, comprising:
    an amplifier to amplify an electric signal corresponding to an intensity of a reflected light from an optical disc;
    a first detection circuit to detect an upper envelope of an output signal from the amplifier, and to output an upper envelope signal;
    a second detection circuit to detect a lower envelope of an output signal from the amplifier, and to output a lower envelope signal;
    a first A/D converter to convert the upper envelope signal into a first digital signal;
    a second A/D converter to convert the lower envelope signal into a second digital signal; and
    a digital signal processing circuit to perform calculation processing of the first and the second digital signals, and to output a signal for controlling reproduction of data recorded on the optical disc, wherein the digital signal processing circuit is provided with:
- a register to store, as initial data of the upper envelope, an output obtained from the first A/D converter in a state where the reflected light from the optical disc is not inputted;
- a second low pass filter to remove a high-frequency component from the first digital signal obtained from the first A/D converter, and to output a low-frequency component of the first digital signal;
- a first multiplier to perform multiplication of the low-frequency component of the first digital signal by a predetermined coefficient K;
- a second multiplier to perform multiplication of the initial data of the upper envelope by a predetermined coefficient (1−K);
- an adder to add the output of the first multiplier and the output of the second multiplier; and
- a second subtracter to subtract the output of the adder from the first digital signal, and to output a defect detection signal which is indicated by polarity data of the subtraction result, as the signal for controlling reproduction.

4. A circuit according to claim 3, wherein the digital signal processing circuit is provided with:
- an inverter to reverse the polarity of the second digital signal, and to output a third digital signal;
- a first low pass filter to transmit a low-frequency component of the third digital signal;
- a first subtracter to subtract the output signal of the low pass filter from the third digital signal; and
- a polarity data extraction circuit to extract polarity data from the output signal of the first subtracter, and to output a track crossing detection signal as the signal for controlling reproduction.

5. A circuit according to claim 4, wherein the digital signal processing circuit is further provided with a counter to count polarity changes of the polarity data, and to output data indicating the number of crossed tracks as the signal for controlling reproduction.

6. A circuit for generating a signal for controlling reproduction of data recorded on an optical disc, comprising:
- an amplifier to amplify an electric signal corresponding to an intensity of a reflected light from an optical disc;
- a first detection circuit to detect an upper envelope of an output signal from the amplifier, and to output an upper envelope signal;
- a second detection circuit to detect a lower envelope of an output signal from the amplifier, and to output a lower envelope signal;
- a first A/D converter to convert the upper envelope signal into a first digital signal;
- a second A/D converter to convert the lower envelope signal into a second digital signal; and
- a digital signal processing circuit to perform calculation processing of the first and the second digital signals, and to output a signal for controlling reproduction of data recorded on the optical disc, wherein an amplification rate of the amplifier is variable, and the digital signal processing circuit is provided with:
  - a third subtracter to subtract the second digital signal from the first digital signal; and
  - an amplification rate setting circuit to set up the amplification rate of the amplifier so that the output of the third subtracter may coincide with predetermined amplitude reference data, the amplification rate setting circuit outputting an amplification rate signal as the signal for controlling reproduction.

7. A circuit according to claim 6, wherein the digital signal processing circuit is provided with:
- a register to store, as initial data of the upper envelope, an output obtained from the first A/D converter in a state where the reflected light from the optical disc is not inputted;
- a second low pass filter to remove a high-frequency component from the first digital signal obtained from the first A/D converter, and to output a low-frequency component of the first digital signal;
- a first multiplier to perform multiplication of the low-frequency component of the first digital signal by a predetermined coefficient K;
- a second multiplier to perform multiplication of initial data of the upper envelope by a predetermined coefficient (1−K);
- an adder to add the output of the first multiplier and the output of the second multiplier; and
- a second subtracter to subtract the output of the adder from the first digital signal, and to output a defect detection signal which is indicated by polarity data of the subtraction result, as the signal for controlling reproduction.

8. A circuit according to claim 7, wherein the digital signal processing circuit is provided with:
- an inverter to reverse the polarity of the second digital signal, and to output a third digital signal;
- a first low pass filter to transmit a low-frequency component of the third digital signal;
- a first subtracter to subtract the output signal of the low pass filter from the third digital signal; and
- a polarity data extraction circuit to extract polarity data from the output signal of the first subtracter, and to output a track crossing detection signal as the signal for controlling reproduction.

9. A circuit according to claim 8, wherein the digital signal processing circuit is further provided with a counter to count polarity changes of the polarity data, and to output data indicating the number of crossed tracks as the signal for controlling reproduction.

10. A circuit for generating a signal for controlling reproduction of data recorded on an optical disc, comprising:
- an amplifier to amplify an electric signal corresponding to an intensity of a reflected light from an optical disc;
- a detection circuit to detect a lower envelope of an output signal from the amplifier, and to output a lower envelope signal;
- an A/D converter to convert the lower envelope signal into a first digital signal; and
- a digital signal processing circuit to perform calculation processing of the first digital signal, and to output a signal for controlling reproduction of data recorded on the optical disc, wherein the digital signal processing circuit is provided with:
  - an inverter to reverse the polarity of the first digital signal, and to output a second digital signal;
  - a low pass filter to transmit a low-frequency component of the second digital signal;
  - a subtracter to subtract the output signal of the low pass filter from the second digital signal; and
  - a polarity data extraction circuit to extract polarity data from the output signal of the subtracter, and to output a track crossing detection signal as the signal for controlling reproduction.

11. A circuit according to claim 10, wherein the digital signal processing circuit is further provided with a counter to count polarity changes of the polarity data, and to output data indicating the number of crossed tracks as the signal for controlling reproduction.

* * * * *